Dec. 28, 1965  L. J. V. ERIKSSON  3,226,674
SAFETY BELT CONTROLLED VEHICLE ELECTRICAL CIRCUIT
Filed Nov. 14, 1962  2 Sheets-Sheet 1
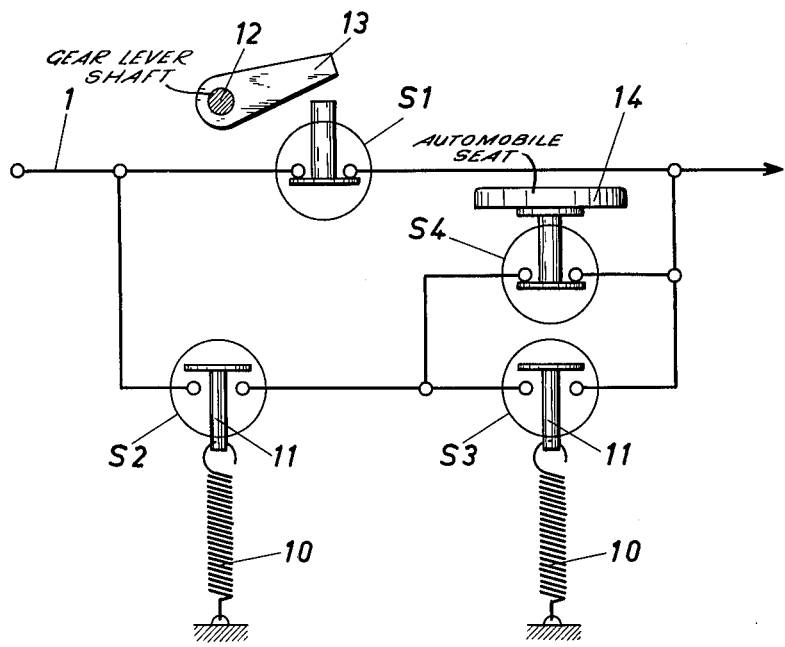
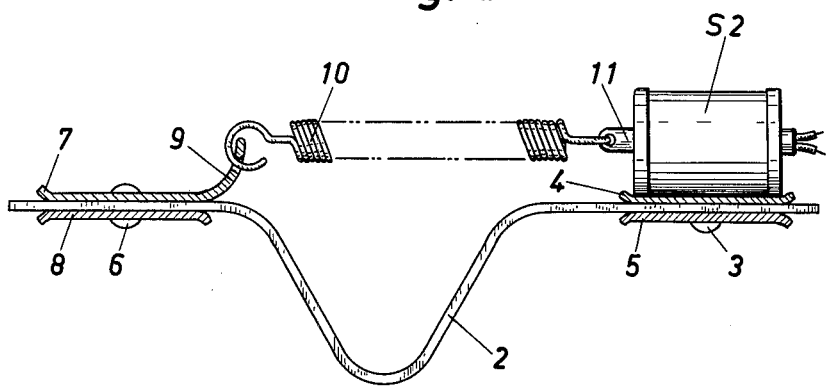
INVENTOR
LEIF JOEL VERNER ERIKSSON
BY *Linton and Linton*
ATTORNEYS

INVENTOR
LEIF JOEL VERNER ERIKSSON

United States Patent Office 3,226,674
Patented Dec. 28, 1965

3,226,674
SAFETY BELT CONTROLLED VEHICLE
ELECTRICAL CIRCUIT
Leif Joel Verner Eriksson, Landvetter, Sweden
(Speldosegatan 4, Gothenburg, Sweden)
Filed Nov. 14, 1962, Ser. No. 237,641
Claims priority, application Sweden, Aug. 10, 1962,
8,711/62; Nov. 24, 1961, 11,697/61
6 Claims. (Cl. 340—53)

Safety belts are presently a rather common piece of equipment in automobiles, but experience has shown that many drivers and passengers forget or just neglect to use the belts. The present invention has for its object to provide an arrangement which is dependent on whether or not the safety belt or belts in an automobile are in use, in such a way, that, when the belt is not put on, the driver's attention is directed to that fact upon the automobile reaching a certain velocity, either by means of an alarm or by means of mechanisms that cause the engine to stop or, in any case, prevent further increase in velocity of the vehicle.

The invention is mainly characterised in that a circuit controlling the operation of the engine or the operation of an alarm device contains a first contact device adapted to reverse the state of the circuit (open or closed circuit) upon the automobile reaching a certain velocity, and a second contact device connected with the safety belt and adapted to cancel the influence of said first contact device on said circuit when the safety belt is in use, the arrangement being such that the automobile is prevented from exceeding said velocity, or exceeding said velocity causes activation of said alarm device, respectively.

In automobiles where, besides the driving seat, one or more of the passenger seats also are provided with safety belts, the contact devices of the individual safety belts are preferably, according to the invention, connected in the circuit in such a way, that the influence of said first contact device on the circuit is cancelled only when all the safety belts are in use. In such a case, it is also feasible to install, at each of the passenger seats which is provided with safety belts, a contact device adapted, when the seat is not loaded, to cancel the influence on the circuit caused by the contact device connected with the corresponding safety belt.

In the case of an automobile having a manually operated gear change mechanism, said first contact device may be adapted, according to the invention, to be actuated by the gear change lever or means connected therewith upon changing into a high gear.

In one embodiment of the invention concerning petrol engine automobiles the various contact devices are connected in the primary circuit of the ignition system.

According to the invention, the contact device connected with the safety belt may consist of a switch secured to one part of the belt and having a pull-operated actuating member which is coupled, preferably by means of a draw spring, to an attachment secured to said belt part at such a distance from said switch, that said actuating member will be pulled, thereby reversing the switch, upon said belt part being stretched.

In case the arrangement according to the invention is employed for causing the engine to stop, for instance by interrupting the ignition current, when the chosen speed limit is reached, then the fact that the engine suddenly stops without the driver being prepared therefor may involve certain inconveniences. It is a further object of the present invention, therefore, to provide means which gives the driver an advance warning before the engine stops.

An embodiment of the invention incorporating such a feature is characterised in that the circuit controlled by the aforementioned contact devices contains a relay, by means of which the operation of the engine is controlled by the circuit, and an alarm device adapted to be actuated in conjunction with the relay being switched to the position in which the operation of the engine is interrupted, said relay being provided with a delay device, by means of which switching of the relay to the position interrupting the operation of the engine is delayed, in relation to the activation of said alarm device.

According to the invention, said delay device may comprise a bimetal member preventing movement of the relay contacts and a heat generating device which is actuated simultaneously with the alarm device and adapted to heat said bimetal member so as to cause such deformation thereof, that movement of the relay contacts becomes possible.

In one specific embodiment of the invention, said bimetal member is in the form of a yoke, between the legs of which the contact springs of the relay are clamped in closing position, said heat generating device consisting of a coil of resistance wire placed around the middle portion of said yoke.

The invention will be described more closely herebelow with reference to the accompanying drawings, wherein:

FIGURE 1 is a circuit diagram illustrating one embodiment of the invention;

FIGURE 2 shows a portion of a safety belt provided with a switch according to the invention;

Figure 3:
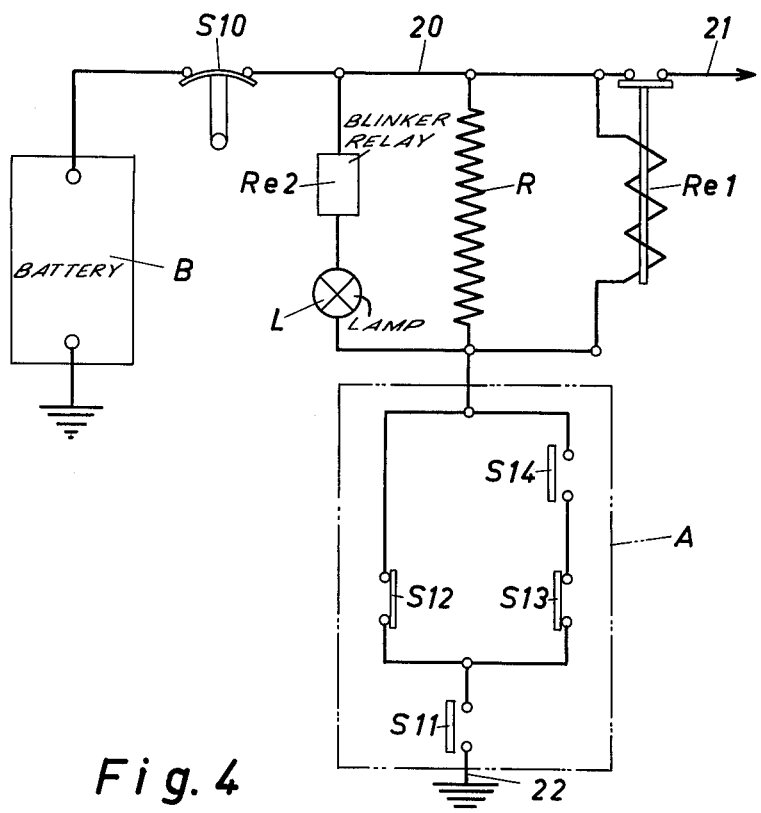
FIGURE 3 is a circuit diagram of a second embodiment of the invention.

The embodiment illustrated in FIGURE 1 of the drawings is adapted for interrupting the ignition current to the automobile engine open upon changing into a high gear. In the lead indicated at 1 in FIGURE 1 between the starter key (not shown) and the ignition coil (not shown) there is inserted a switch S1 and in parallel therewith is connected a switch S2 in series with a switch S3, the latter being shunted by a switch S4. All switches are of the type which is held in a normal (not actuated) position under the action of a spring, against the action of which the switch may be reversed to its other position, from which the switch will be returned to the normal position under the action of the spring as soon as the force causing the reversal is discontinued. The switch S1 is normally closed, S2 and S3 are normally open, and S4 is normally closed.

Switches S2 and S3 are each connected to a safety belt mounted at the driving seat and a passenger seat, respectively, of the automobile in the manner shown in FIGURE 2. In FIGURE 2, numeral 2 designates one part of a safety belt to which are attached two plates 4 and 5 placed in opposite sides of the belt part 2 and interconnected by means of screws 3, thereby clamping the belt part 2 between them. Plate 4 carries the switch S2. At a distance from the switch S2 along the length of the belt part there are attached, in a similar manner as the plates 4 and 5, two plates 7 and 8 which are interconnected by means of screws 6 and and which clamp the belt part between them. The plate 7 situated at the same side of the belt part as the switch is provided with an outwardly bent extension 9 with a hole which forms an attachment for one end of a helical tension spring 10 the other end of which is coupled to a pin 11 projecting out of the switch, said pin being adapted, when pulled, to reverse the switch from the normally open position shown in FIGURE 1 to closed position. The length of spring 10 is so much smaller than the distance along the belt part 2 between the switch S2 and attachment 9, that the belt part, as clearly shown in FIGURE 2, forms a bight between the switch and the attachment 9. When the safety belt is put on, the belt part 2 will become stretched, so that the bight will be straightened out causing the linear distance between the switch S2 and the attachment 9 to increase, so that, by the intermediary of spring 10, the pin 11 is subjected to a pull whereby the switch S2 is reversed to closed position. When the safety belt is taken off the switch is permitted to return to the normal position under the action of the built-in return spring.

In the example shown in FIGURE 1 the automobile is assumed to be provided with a gear change lever mounted on the steering column. On the gear lever shaft indicated at 12 in FIGURE 1 there is attached an arm 13 extending from the shaft at an angle thereto, and the switch S1 is mounted adjacent said arm 13 so that it will be actuated thereby upon changing into, for example, the highest gear. Switch S4 is adapted to be actuated by the seat 14 of the passenger seat diagrammatically shown in FIGURE 1, in such a way, that when the seat is not loaded the switch will be in its normal, closed position, while upon the seat being loaded, that is when a person is sitting on the passenger seat, the switch S4 will be reversed to open position.

In the diagram of FIGURE 1 the switches S1–S4 are shown in their normal, that is not actuated, positions. The ignition current circuit is hereby closed through the switch S1 as long as the gear lever is not put into position for the highest gear, so that it will be possible to drive the automobile in all the lower gears independently of the positions of the remaining switches S2, S3 and S4. When the gear lever is put into position for the highest gear, the switch S1 is reversed to open position thereby interrupting the ignition current circuit, provided the other switches are in the positions shown in FIGURE 1. If the driver then puts on his safety belt, the switch S2 will be closed as described above whereby, provided there is no passenger on the passenger seat, the circuit will be closed through the switches S2 and S4 independently of the position of the switch S1. If, on the other hand, a passenger is sitting on the seat belt 14, then switch S4 will be reversed to its open position, so that the current cannot pass through switches S2 and S4. To thereby close the circuit it will be necessary that also the passenger puts on his safety belt so that the switch S3 will be closed, whereby the current will be passing through S2 and S3.

It will be obvious without further explanation that the arrangement described above may be extended for use with several safety belts by connecting the switches associated with the additional safety belts in series with the switches S2 and S3 in the branch shunting switch S1, whereby each of these additional switches will be shunted by a switch corresponding to S4 in FIGURE 1 and governed by the load on the associated passenger seat.

In the example described above and shown in FIGURE 1 of the drawing, the object is to interrupt a circuit, viz: the ignition circuit of the engine. The circuit may of course also be modified for closing, for instance for activating an alarm device. In the latter case the circuit may contain a speed warning device of a kind known per se which is adapted to activate an alarm upon the vehicle reaching a certain velocity.

One embodiment in which the network of switches are adapted for closing a circuit rather than for interrupting a circuit is ilustrated in FIGURE 3. In the circuit diagram of FIGURE 3, reference character B indicates the car battery, one pole of which is connected to the chassis and the other pole of which is connected to the starter switch indicated at S10. The lead 20 from the other side of the switch S10 is connected to a lead 21 via the contacts of a relay Re1, the lead 21 being connected to the ignition system of the automobile. The coil of the relay Re1 has one end connected to the lead 20 and the other end connected to a network of switches S11–S14 shown inside the broken-line box A in FIGURE 3, said switch network being connected to the chassis by means of a lead 22, so that the circuit through the battery B and the relay Re1 may be closed by certain combinations of the positions of the switches S11–S14 as will be described hereinafter. In parallel with the relay coil Re1, that is between the lead 20 and the network A, there is connected a lamp L in series with a blinker relay Re2, and also a resistance R consisting of a coil of resistance wire forming part of the device shown in FIGURE 4 for delaying the switching of the relay Re1.

Figure 4:
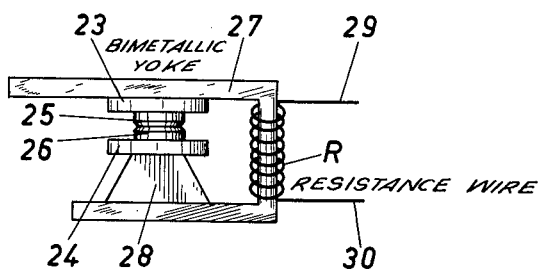
FIGURE 4 illustrates a delay device used in the circuit of FIGURE 3.

In FIGURE 4, numerals 23 and 24 indicate the contact springs of the relay Re1 which are provided with contact pieces 25 and 26, respectively, at the sides facing each other. The contacts are normally closed, that is they are closed as long as the relay is not activated. Numeral 27 indicates a yoke-shaped piece of bimetal, the middle portion of which carries the resistance wire winding R and the legs of which embrace the contact springs 23, 24 and clamp them together in the closing position by means of an electrically insulating distance piece 28 disposed between one yoke leg and the contact spring 24. When current is applied to the winding R via the input leads designated 29 and 30 in FIGURE 4, the winding will be heated and will thereby heat the bimetal yoke 27 so that the latter will become expanded and permit the contact springs 23, 24 to be separated.

In the network A, the switch S11 is connected in series on the one hand with the switch S12 and on the other hand with the switches S13 and S14, which are interconnected in series and together shunt the switch S12. All of the switches S11–S14 are of the spring-return type described above in connection with FIGURES 1 and 2, that is they have a normal (not actuated) position from which they may be reversed against the action of the spring which after the actuating force has been discontinued returns the switch to the normal position. The switch S11 is normally open and intended to be reversed to closing position upon the automobile reaching a certain velocity, and it may for this purpose be adapted to be actuated upon moving the gear lever of the automobile into position for highest gear as described above in connection with switch S1 of FIGURE 1. The switches S12 and S13, which are normally closed, are connected with the driver's safety belt and a safety belt mounted at a passenger seat, respectively, in such a manner, that these switches remain in their closed position as long as the corresponding safety belt is not used, and will be held in open position when the belt is in use. Switches S12 and S13 may for instance be mounted on the safety belt in the manner described above in connection with FIGURE 2. Switch S14 consists of a normally open contact device which is mounted in that passenger seat, the safety belt of which is provided with the switch S13, so that switch S14 will be held in closing position by a load on the seat, that is when the seat is occupied by a passenger.

Thus, for closing the circuit through the relay coil Re1, when the ignition switch S10 is in the "on" position, it is required both that the switch S11 is closed (highest gear engaged) and that either the switch S12 is closed (the driver's safety belt not put on) or both switches S14 and S13 are closed (the passenger seat occupied; the passenger safety belt not put on).

As long as the automobile is driven in the lower gears, switch S11 remains unactuated and the circuit will thus be open independently of the positions of the remaining switches S12–S14. The ignition circuit is then closed via the contacts of relay Re1. When the highest gear is engaged, S11 will be reversed to closing position, and the circuit through the relay coil Re1 will then remain open so that the ignition circuit remains closed by the contacts of the relay, provided both that the driver's safety belt is put on (S12 open) and that either the passenger seat is unoccupied (S14 open) or the passenger belt is put on (S13 open).

In case S12 is closed, or both S13 and S14 are closed, then the closing of S11 when engaging highest gear will cause closing of the circuit through Re1 and at the same current will flow through the resistance winding R and the lamp L with the blinker relay Re2. The blinking light from the lamp warns the driver that the ignition circuit will be interrupted, which takes place as soon as the resistance wire R has heated the bimetal yoke 27 so that the latter will permit the contacts of the relay Re1 to be moved to closing position as described above. The required delay from activation of the alarm lamp L until the ignition current is interrupted may easily be obtained by suitable dimensioning of the bimetal yoke 27 and the resistance wire R.

The last-described embodiment may be easily modified for use in an automobile with several passenger seats provided with safety belts. In this case each additional safety belt is provided with a switch corresponding to S13, the corresponding seat is provided with a switch corresponding to S14, and each safety belt switch in series with the related seat switch is connected in parallel with the parallel branches S11 and S13, S14 in the switch network A.

The invention is not limited to the embodiments hereinbefore described and as shown in the drawings, said embodiments being susceptible of modifications with respect to their details without departing from the spirit of the invention. Thus, the device may be adapted for causing the engine to stop in some other manner than by interrupting the ignition current, and in such a case the circuit shown in FIGURE 3 incorporating relay Re1 and the switch network A may of course be modified from being normally open to being normally closed, whereby the switch network may be constructed as shown in FIGURE 1. With respect to the delay device for the relay Re1 in FIGURE 3 the invention is not limited to the embodiment shown and described, and the lamp L with blinker Re2 may of course, if desired, be replaced by, or combined with, an acoustic alarm device. It should also be understood that instead of being adapted for actuation by the gear change lever the switch S11 may be arranged for being actuated by other means having functional relationship with the velocity of the automobile, such as the throttle control or speed indicator.

What I claim is:

1. In an automobile having at least one safety belt, electrically operated means for interrupting the operation of the engine, an electrically operated alarm device, an electrical circuit connecting said interrupting means and said alarm device to a source of electric power, said circuit comprising switch means for reversing the state of the circuit upon the occurrence of a predetermined operating condition of the automobile, being related to the speed of the automobile, said circuit further comprising switch means associated with said safety belt and adapted to cancel the influence of said first mentioned switch means on said circuit when said safety belt is in use, and delay means delaying the operation of said interrupting means in relation to the operation of said alarm device.

2. The arrangement claimed in claim 1 where the automobile has a manually operated gear change mechanism, means connected with said gear change mechanism for actuating said first mentioned switch means when said gear change mechanism is in a high gear position representing said predetermined operational condition of the automobile.

3. An arrangement as claimed in claim 1 wherein said means for interrupting the operation of the engine comprises a relay, the ignition circuit for the engine being normally closed through the contacts of said relay, said delay means comprising means for temporarily preventing movement of said relay switch contacts upon said relay coil being subjected to said reversing of the state of said circuits.

4. In an automobile having at least one safety belt, circuit controlling means comprising an electrical circuit connected to a source of electrical current, a first contact device in said circuit adapted to reverse the state of said circuit upon the automobile reaching a certain velocity, and a second contact device in said circuit adapted to cancel the influence of said first contact device on said circuit when the safety belt is in use, said second contact device consisting of a safety belt connected to the automobile, a switch secured to one part of said belt, a pull-operated actuating member secured to said belt one part at a distance from said switch and said belt having a portion thereof of greater length between said switch and said actuating member, than the length of said actuating member whereby said actuating member is extended only when said belt is drawn taut in use.

5. In an automobile having an engine ignition system, velocity control means, and at least one safety belt, circuit controlling means comprising an electrical circuit connected to a source of electrical current and said engine ignition system, a normally closed switch in said circuit connected to and operable to open position by the safety belt when in use, a second normally open switch in said circuit adapted to be closed by said velocity control means when the automobile reaches a given velocity, a relay in said circuit controlling said ignition system and having spring contacts, an electrically operated alarm in said circuit adapted to be actuated when said switches are closed and said relay is switched to its position for interrupting said ignition system, a delay device in said circuit consisting of a bimetallic member normally retaining the relay contacts from movement and an electrically operated heat generating device electrically connected to said alarm for being actuated therewith and positioned adjacent said bimetallic member for heating and thereby deforming the same permitting delayed movement of said relay contacts.

6. In an automobile having an engine ignition system, velocity control means and at least one safety belt as claimed in claim 5 wherein said bimetallic member is a bimetallic yoke having legs with said relay spring contacts positioned and retained therebetween in their contacting position and said heat generating device consisting of a coil of resistance wire extending around the base of said yoke.

References Cited by the Examiner

UNITED STATES PATENTS

| | | | |
|---|---|---|---|
| 2,824,293 | 2/1958 | Meinhardt | 340—52 |
| 3,074,055 | 1/1963 | Rudolph et al. | 340—52 XR |

NEIL C. READ, *Primary Examiner.*